(12) United States Patent
Halstead

(10) Patent No.: US 8,456,033 B2
(45) Date of Patent: Jun. 4, 2013

(54) ANTENNA MOUNTED WIND POWER GENERATOR

(75) Inventor: Richard Halstead, Rohnert Park, CA (US)

(73) Assignee: Empire Magnetics Inc., Rohnert Park, CA (US)

( * ) Notice: Subject to any disclaimer, the term of this patent is extended or adjusted under 35 U.S.C. 154(b) by 365 days.

(21) Appl. No.: 12/902,353

(22) Filed: Oct. 12, 2010

(65) Prior Publication Data

US 2011/0148116 A1    Jun. 23, 2011

Related U.S. Application Data

(60) Provisional application No. 61/287,635, filed on Dec. 17, 2009.

(51) Int. Cl.
*F03D 9/00* (2006.01)

(52) U.S. Cl.
USPC ............................................. 290/55; 290/44

(58) Field of Classification Search
USPC ..................................... 290/44, 55
See application file for complete search history.

(56) References Cited

U.S. PATENT DOCUMENTS

| | | | |
|---|---|---|---|
| 7,138,961 B2 * | 11/2006 | Sievert | 343/890 |
| 7,329,965 B2 | 2/2008 | Roberts et al. | |
| 7,456,513 B2 | 11/2008 | Meyers et al. | |
| 7,646,132 B2 | 1/2010 | Halstead | |
| 2008/0253889 A1 | 10/2008 | Krivcov et al. | |
| 2009/0086465 A1 * | 4/2009 | St-Germain et al. | 362/89 |
| 2009/0200883 A1 * | 8/2009 | Halstead | 310/90.5 |
| 2009/0224554 A1 * | 9/2009 | Flynn | 290/55 |
| 2011/0062717 A1 * | 3/2011 | Price, Jr. | 290/55 |

* cited by examiner

*Primary Examiner* — Vanessa Girardi
(74) *Attorney, Agent, or Firm* — Edward S. Sherman

(57) ABSTRACT

A cellular communication tower is adapted to support a vertical axis wind turbine (VAWT) that includes a generator mechanism. The signal and power cable for the communication antennas run through the central axis or bore of the generator. The blades of the VAWT are disposed so as to avoid interferences with communication signals. The tower preferably deploys an open truss construction to avoid the impact of periodic pressure pulse as the turning blades shift out of alignment from shading the tower. Thus, with an open truss tower the turbine blades can be a larger size and still not cause such pressure pulses.

20 Claims, 8 Drawing Sheets

FIG.4A
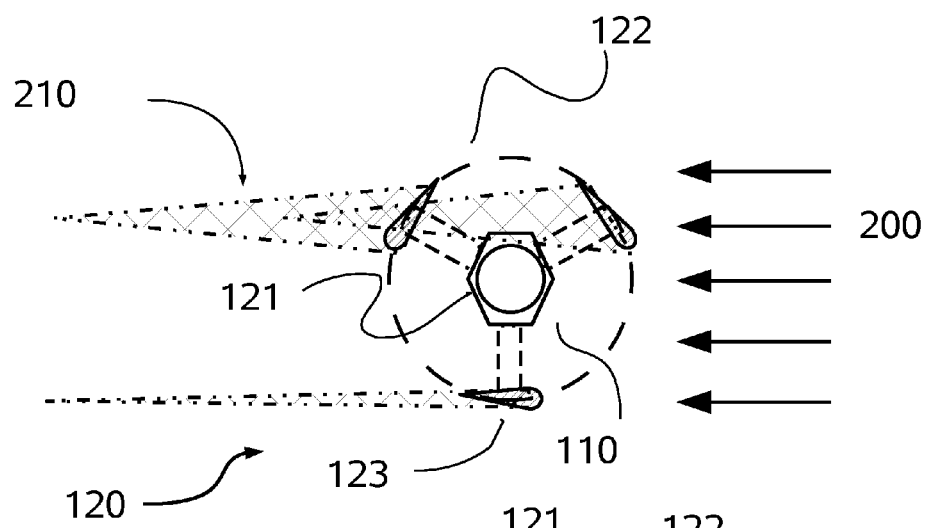
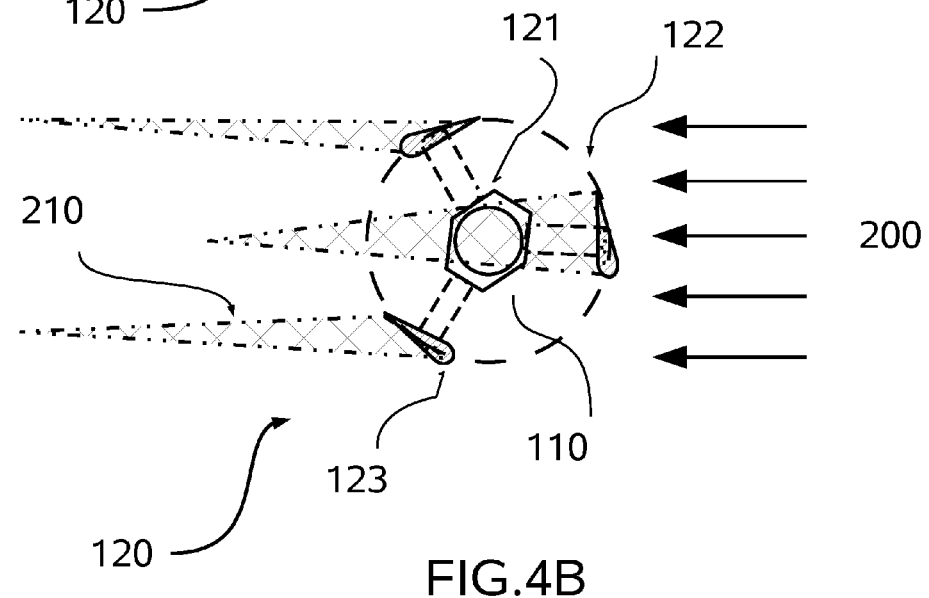
FIG.4B

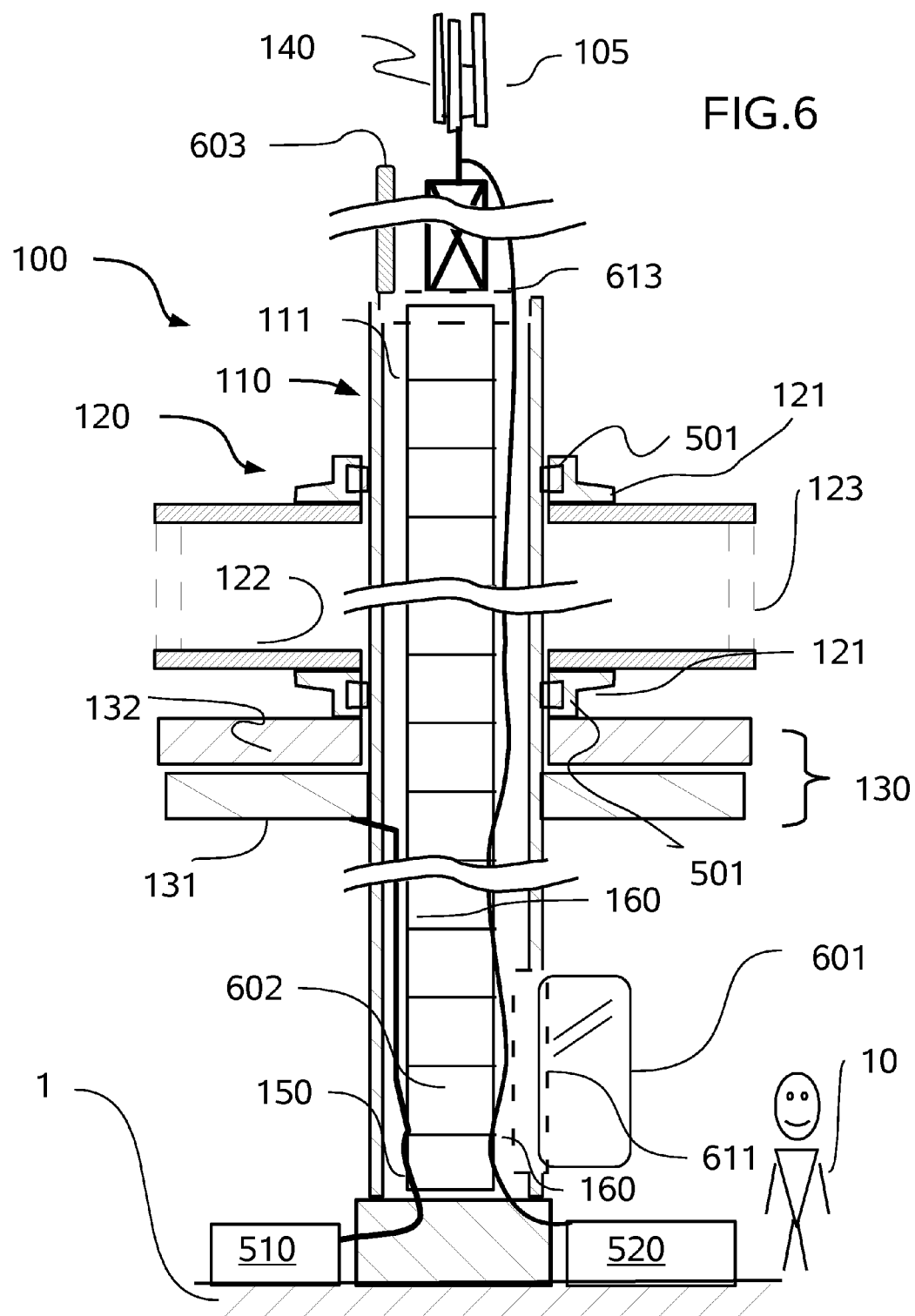

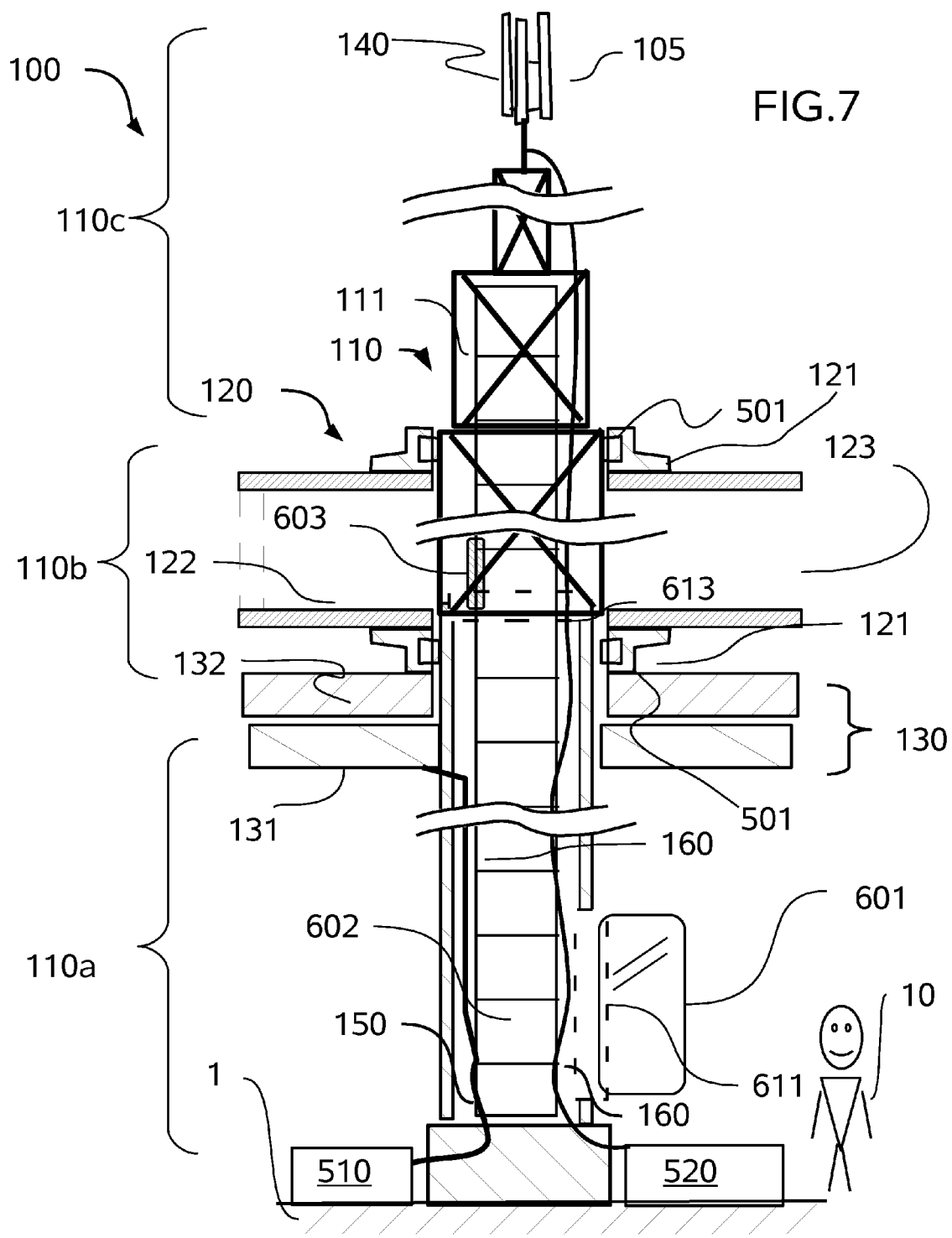

ANTENNA MOUNTED WIND POWER GENERATOR

CROSS REFERENCE TO RELATED APPLICATIONS

The present application claims the benefit of priority to the U.S. provisional application of the same title having application Ser. No. 61/287,635, which was filed on Dec. 17, 2009, which is incorporated herein by reference.

BACKGROUND OF INVENTION

The present invention relates to the provision of energy to wireless telecommunications systems, and in particular to such provision by wind powered generators, as well as to the generation of electrical power from wind energy.

Wireless telecommunications technology is especially attractive to remote communities lacking an existing signal wire system, and in particular to developing countries that have no or minimal telecommunications outside of major cities.

However, while cellular wireless telecommunication is well advanced, the locations most lacking in these services also frequently lack connection to a reliable electrical power distribution infrastructure to provide power to the electronic systems, such as the radio frequency and microwave transceivers, deployed on cellular telecommunication transmission towers.

It is therefore a first object of the present invention to provide a means for powering the electronics systems deployed on remote cellular telecommunication transmission towers as well as provide a reliable power source for remote cell communication towers It is a further object of the invention to reduce the installed cost of generating electrical power by taking advantage of telecommunication infrastructure.

SUMMARY OF INVENTION

In the present invention, the first object is achieved by providing a tower structure comprising, a substantially vertical support tower having a top portion and a lower mounting base and at least a portion with a central vertical lumen or opening therein between the top portion and the lower mounting base thereof, a vertically arrayed wind turbine (VAWT), having a central mounting hub and a plurality of turbine blades coupled thereto to provide free rotation about the central opening of said substantially vertical support tower, an electrical generator rotationally coupled to said central mounting hub, at least one of a receiver, transmitter or transceiver of electromagnetic radiation supported by said a substantially vertical support tower and disposed above said VAWT, at least one cable for power transmission extending downward from the generator, being electrically coupled thereto to the lower mounting base, and at least one cable extending upward from the lower mounting base through the central mounting hub of the VAWT to connect in signal communication with said at least one of an receiver, transmitter or transceiver.

The above and other objects, effects, features, and advantages of the present invention will become more apparent from the following description of the embodiments thereof taken in conjunction with the accompanying drawings.

BRIEF DESCRIPTION OF THE DRAWINGS

FIGS. 4A and B is a plan view of section A-A of FIG. 1 illustrating alternative positions of the antenna blades

FIG. 6 is cross-section elevation of a third embodiment of the invention.

FIG. 7 is cross-section elevation of a fourth embodiment of the invention.

FIG. 8A is a plan section view of a portion of the tower and generator/alternator showing a preferred method of assembly, whereas

DETAILED DESCRIPTION

Figure 1:
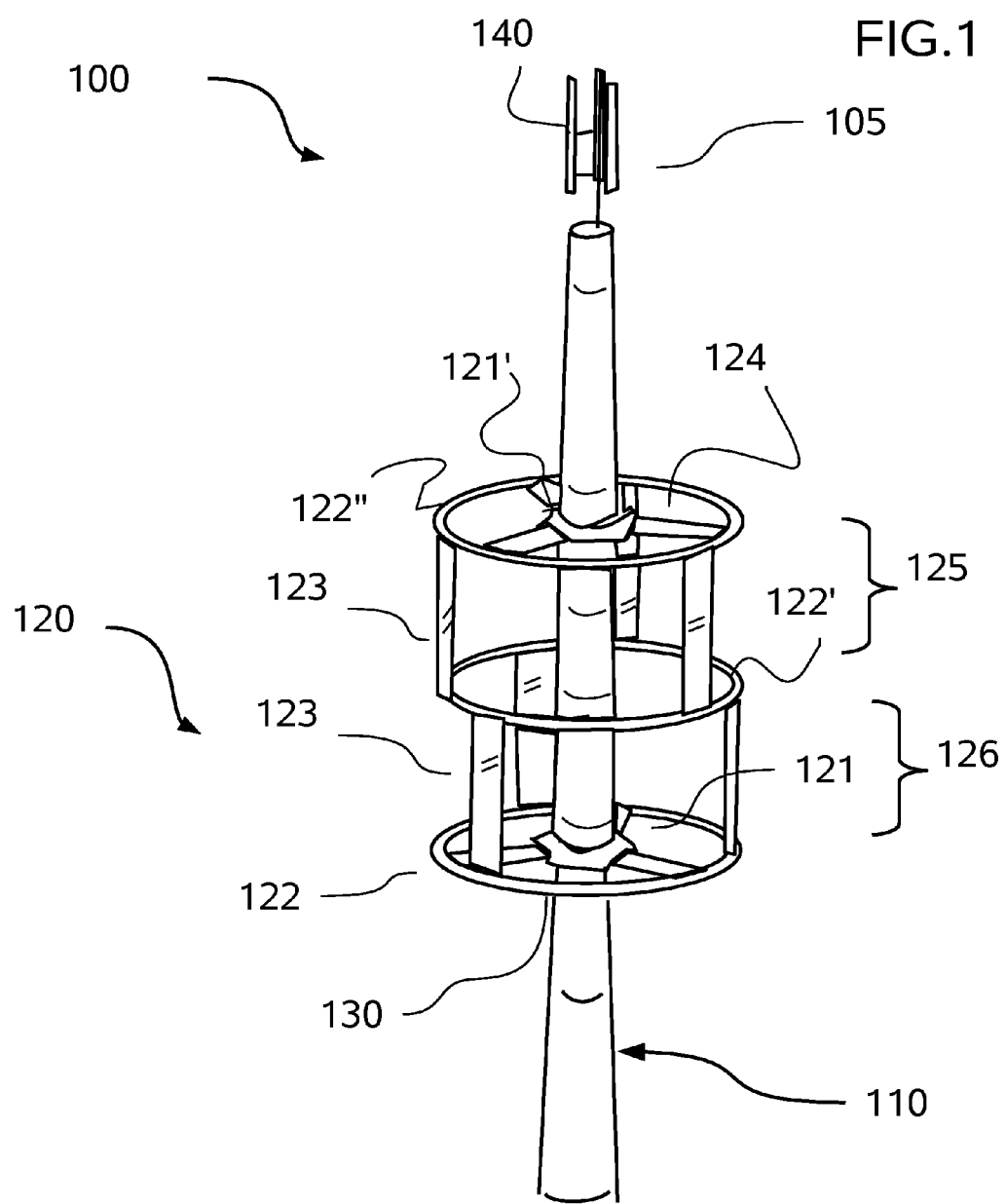
FIG. 1 is a perspective view of a first embodiment of the invention.

Referring to FIGS. 1 through 8, wherein like reference numerals refer to like components in the various views, there is illustrated therein a new and improved antenna mounted wind power generator, generally denominated 100 herein.

In accordance with the present invention, FIG. 1 illustrates a first embodiment of the antenna mounted wind power generator 100 that comprises an antenna assembly 105, consisting of generally conventional antenna devices, in this case panel type transceivers 140 of electromagnetic radiation that transmit and receive encoded RF or microwave signal information. This antenna assembly 105 is mounted at the top of the antenna support tower 110 and disposed above the vertically arrayed wind turbine (VAWT) 120. In this embodiment the antenna support tower 110 is a tubular tower, having a generally circular cross-section. At least a portion of the antenna support tower 110 below the antenna assembly 105 has a lumen or central vertical opening 111, although it appears solid on the outside. The VAWT 120 is mounted on the antenna support tower 110 below the antenna assembly 105, being disposed for free rotation about the central opening 111 via at least one pairs of two hubs 121 and 121' that are coupled to the antenna support tower 110. Since this particular VAWT 120 has a pair of coupled blade assemblies 125 and 126 stacked on each other there are 2 hubs, 121 being disposed at the top of the upper blade assembly 125 and 121' being disposed at the bottom of the lower blade assembly 126. Radial struts 124 extend outward from each hub 121 and connect to horizontally disposed blade support rings 122, 122' and 122'''. The blades 123 are vertically disposed and connect to each blade assembly 125 and 126 by the blade support rings 122 and 122' or 122' and 122'', at their top and bottom Thus, each of the blade assemblies 125 and 126 has in common the centrally disposed of the three blade support rings 122', which is not connected to the antenna support tower 105 directly. The generator 130 is preferably disposed below hub 121 so that its rotor 132 can be connected to the rotating outer portion of the lower hub 121 that is driven by wind induced rotation of the rings supports 122 by the force acting on the turbine blades 123. A preferred VWAT architecture is described in US Pat. Appl. no. US 2008/0253889 A1, of Krivcov et al. that published on Oct. 16, 2008 for a VERTICAL AXIS WIND TURBINES, which is incorporated herein by reference.

Alternative designs for VWAT are also disclosed in U.S. Pat. No. 7,329,965 B2 issued to Roberts et al. on Feb. 12, 2008 for an AERODYNAMIC-HYBRID VERTICAL-AXIS WIND TURBINE, which is also incorporated herein by reference. It is not intended that the invention be limited to any particular form of a VAWT.

Figure 5:
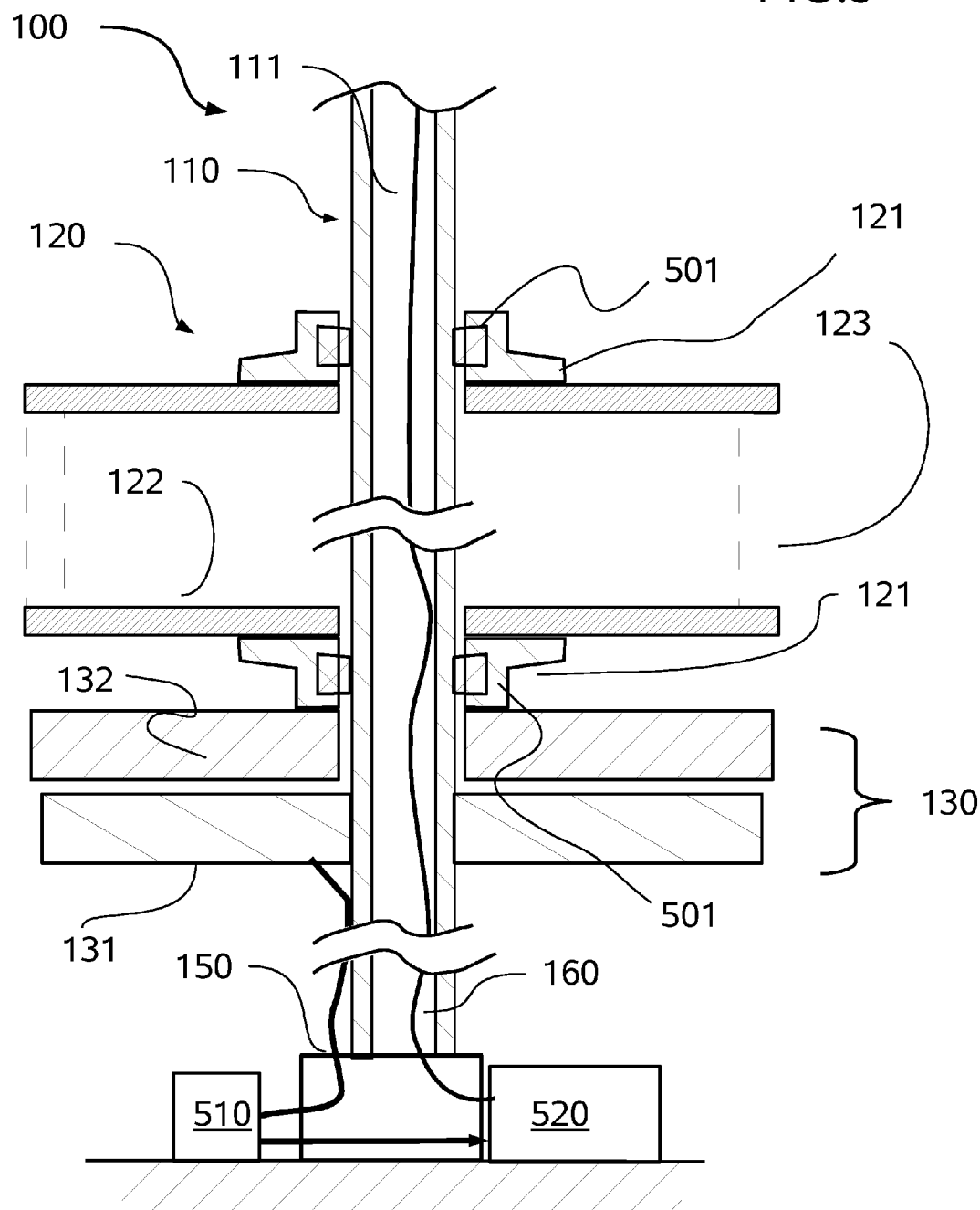
FIG. 5 is cross-section elevation of a portion of the embodiment shown in FIG. 1-3.

As the portion of the tower 110 that support the VAWT 120 cannot interfere with the hub rotation, the signal cables 160 that connects a base station 520 to the RF or microwave transceiver 140 runs through the lumen or central vertical opening 111, as shown in FIG. 5. The power cable(s) 150 emanate from the generator 130 can run down either the outside of the tower 110 or through the portion of the central opening 111 that extends below the vertical expanse of the VAWT 120.

Generally speaking VAWT's have particular advantages as compared to deploying horizontal axis wind turbines. This is particularly true for the inventive combination with the antenna system 105 at the top of the tower. The VWAT blades 123, being oriented in the same direction of the tower 110 are below the antenna 140 and will not shadow or block them in a manner that would attenuate signals.

Further, because the centers of gravity of the VWAT 120 and generator 130 align are both disposed on the central or primary vertical axis of the on the antenna tower 110, the structural demands of the antenna tower 110 are not expected to be significantly greater than they would be for just the antenna assembly 105. As a mounting tower is a significant part of the cost of any wind turbine system, using cellular telephone transmission towers reduces the cost to supply electrical power with a wind turbine, which can power the antenna or serve other users in the area.

Further as the preferred embodiment of the VWAT is efficient at generating power in light winds from any direction, the antenna mounted wind generator system is practical and useful to deploy in most locations where the antennas would be sited for communication purposes only. The ability to generate power in light winds from any direction favors using the VWAT generated power to energize the antenna system itself as described further below, as it is more likely that power will be available when needed. However, to the extent there is not always the minimum wind necessary to generate power, back up batteries, or any other energy storage medium for such occasions could at least be of are reduced size to accommodate the rare occasions where there would not be sufficient wind to turn the VWAT.

Further, as VWAT's 120 have lower tip speed of the turbine blades that rotate in a vertical plane about a horizontal shaft they tend to minimize the potential for bird kill.

In the embodiment shown in FIG. 1, the antenna support tower 110 is an elongated tube of generally circular cross-structure.

Figure 2:
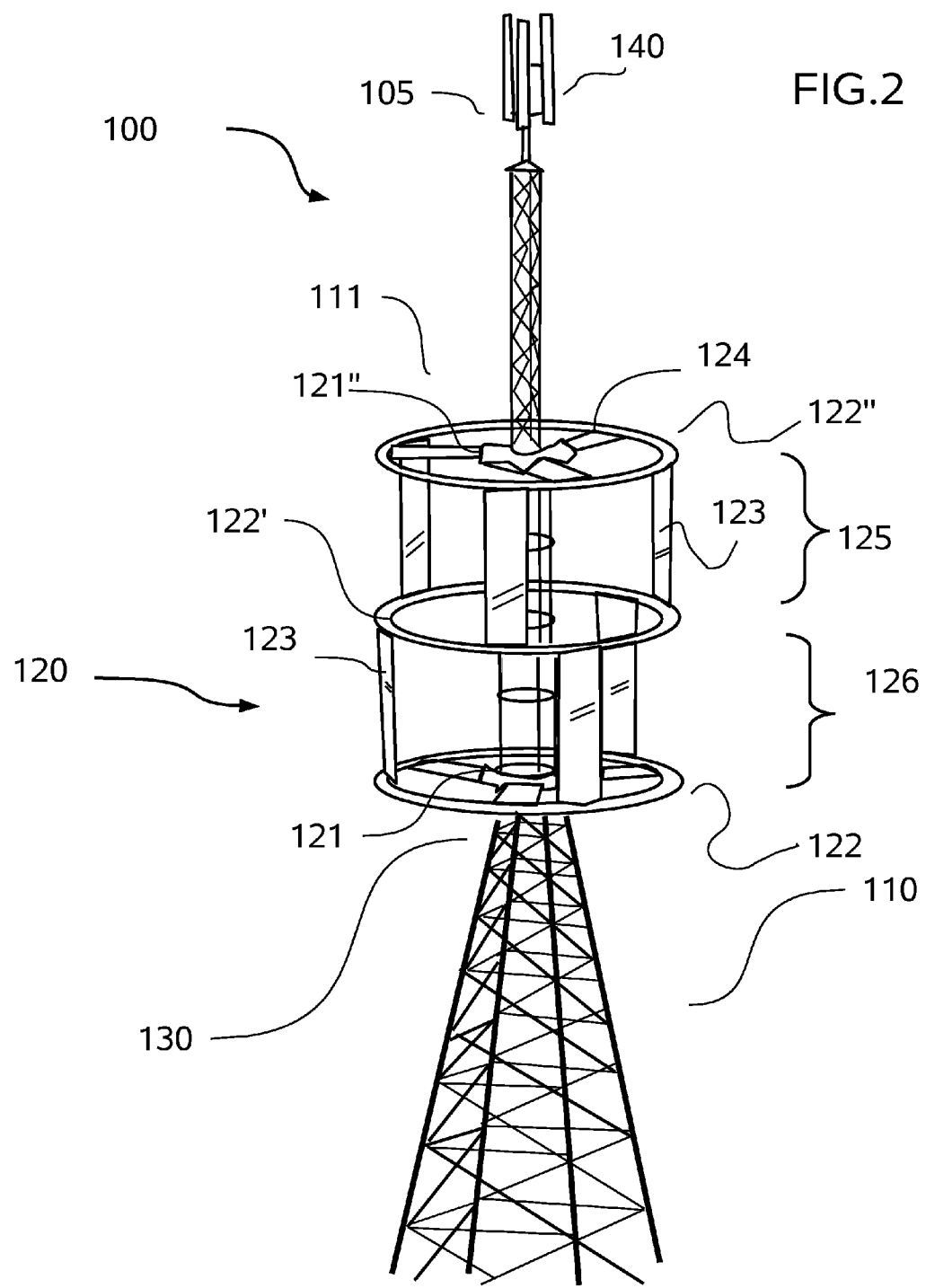
FIG. 2 is a perspective view of a second embodiment of the invention.

In the embodiment shown in FIG. 2 the antenna support tower 110 has an open truss framed tower from the ground until the antenna portion 105.

In the embodiment shown in FIG. 3 the antenna support tower 110 is an elongated tube of generally circular cross-structure in the lower portion 110a between the ground and the generator 130, which is situated just below hub 121 to couple to the rotor 132 (FIG. 5). However, the central portion 110b of the tower 110 that runs through the VWAT 120 is of a truss type framed construction. One non-limiting example of such a frame construction is illustrated as composed of vertically spaced apart rings held at their outer periphery by a plurality of vertical posts.

FIGS. 4A and 4B illustrate why the embodiment of FIG. 2 is more preferred over that in FIG. 1. In these figures the wind is coming from the left as indicated by the array of arrows 200. Each turbine blade 123 creates a lower pressure "shadow" 210 in the region behind it with respect to the wind direction and blade shape. In FIG. 4A, the shadows 210 do not cross the cross-section of the antenna tower inside hub 121, hence the antenna is subjected to the force of the wind 200.

However, in FIG. 4B, as the blades 123 have rotated with support ring 122, a blade now casts a lower pressure "shadow" that includes the tower 110. Thus, with a solid tower, due to its wider cross-section, will be subject to a periodic variation in stress as the VWAT rotates, coming in and out of the shadow 210. However, if the section of the tower 110b within the central axis of the VWAT's rotation is generally open constructed from struts, rings or trusses, the pressure variation will be lower although the same "shading" will still occur, as the such constructions present a much small cross-section when not "shaded" in FIG. 4A.

Figure 3:
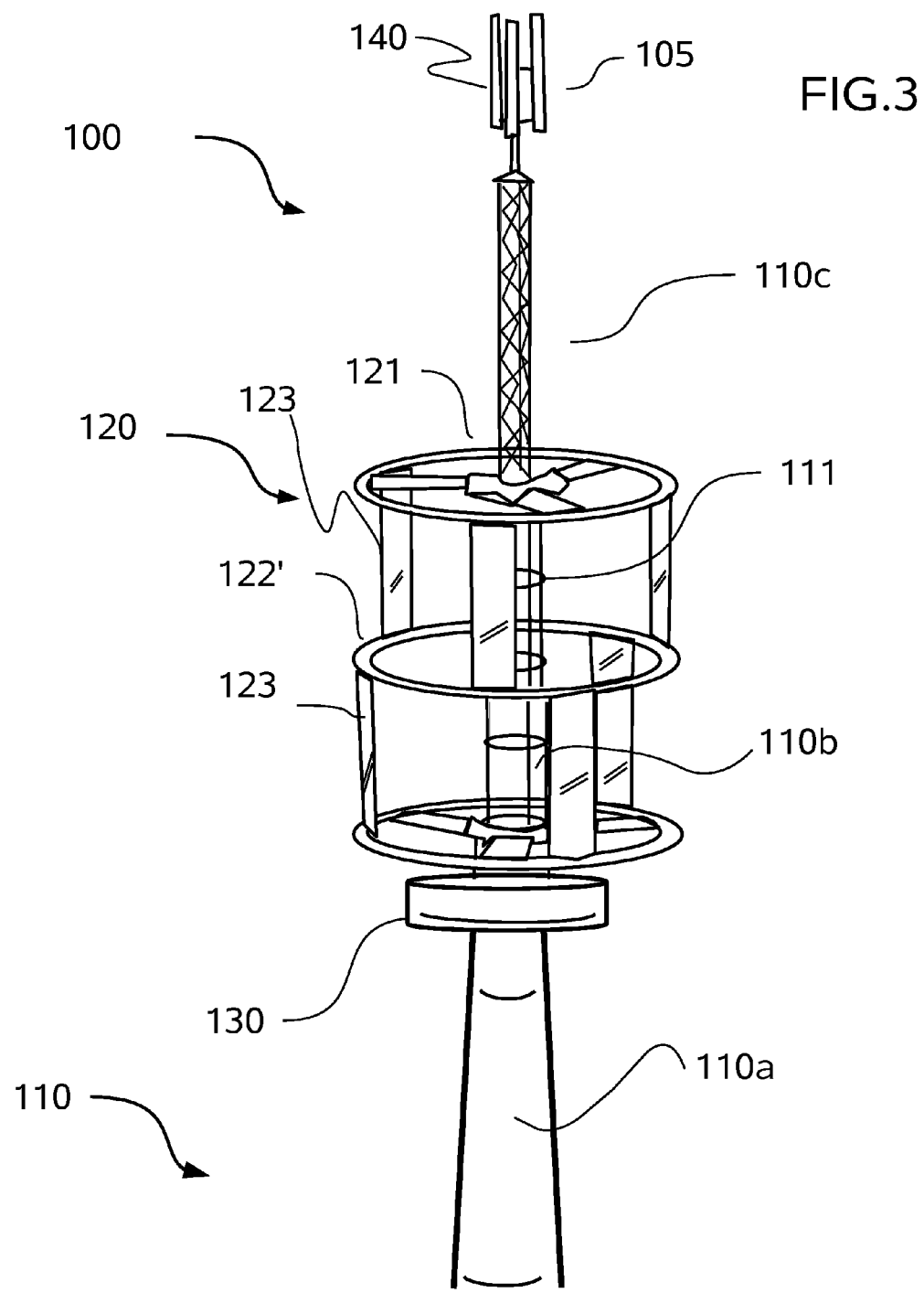
FIG. 3 is a perspective view of a second embodiment of the invention.

Thus, FIG. 2 and FIG. 3 are more preferred embodiments because they minimize such periodic stress and potential for movement to the antenna 105. Where a solid tower cross-section is preferred at a least the ground level, the embodiment of FIG. 3 is more preferred as the strut or frame is only visible far from the ground away for the height of the VWAT 120.

FIG. 5 illustrates in more detail an embodiment for coupling the rotating portion of the hub 121, to the stator 131 of generator 130. The hub 121 that supports the VWAT blades 123 is connected in rotary engagement with the tower 110 by the bearing plate 501. FIG. 5 also illustrates an additional embodiment in which the power generated by the VWAT, via generator 130, is transmitted via cable 150 to a battery 510. The battery 510 optionally powers the base electronic system or unit 520 that is connected to the signal cable 160. The signal cables 160 convey signal and routing information to the base electronic system for routing to different antennas or land based telecommunication cables. The base electronic signal system need not be located at ground level, and it components can be disturbed in different location with respect to the antenna assembly 105. Thus, antennas or transceivers 140 are optionally self-powered by the VWAT 120, or powered by the VWAT 120 via a battery 510, when either normal (land base power) or wind power is not available due to insufficient breezes.

It should be appreciated that the various embodiment described above have the benefits of reducing the installed cost of generating electrical power by taking advantage of telecommunication infrastructure, that is the necessity of having erected plural remote towers for cellular phone communications. Thus the power generated by VWAT 120 can be used by local users or feed back into the power grid.

VWAT's of the preferred design has several advantages for recharging the batteries of a cell phone base station, or generating electricity in general. As the cell phone towers are likely to be situated by reception criteria, and not specifically to take advantage of locations with steady high wind conditions, the VWAT design is particularly advantageous because it is self starting in low wind conditions. Further, the performance of the VWAT does not depend on the wind direction, in that is omni-directional. Not only does the generator's 130 electrical output not depend on the compass heading of the wind, it also doesn't matter how rapidly it changes direction. Thus, the preferred VWAT turbine still captures wind energy as the wind changes direction, which that is continuously converted to electrical power. Further, the VAWT mass acts as a flywheel, picking up some speed in wind gusts and continuing to rotate in the short periods of low wind. Accordingly, a VWAT of the preferred design can be constantly charging the back-up battery or generating power in a wider range of cell tower location. Unlike Horizontal Axis Wind Turbine (HAWT), there is no requirement for the windmill to "seek" the wind direction. Accordingly another advantage of the invention is the elimination of the expensive and unreliable mechanics related to pointing an HWAT toward the wind.

Thus, a VWAT will have a smooth, steady, quiet motion eliminating noise, and reducing energy losses of starting and stopping. Vibrations in the mounting structure are also reduced, while the flywheel effect gives a more constant voltage output to the electronics. Accordingly, the various embodiment of the invention will provide a reliable power source for remote cell communication towers and other users or consumers of power.

It is also expected that the preferred embodiments will not cause interference with RF transmission, as well as provide for easier maintenance to the generator, such as replacing bearings, without the need to depower or terminate RF transmission.

In furtherance of another objective of facilitating maintenance of the RF transmission system 105, FIG. 6 illustrates a more preferred embodiment in which a tower 110 is hollow and can be entered at or near the ground 1 via a lower access door 601 via portal 611 that allows maintenance personnel 10 to enter and climb up the internal ladder 602, exiting an upper access door 603 at portal 613, thus leading them to the panel type transceivers 140 and connecting signal cables 160 that also runs through tower 110. The ladder 602 can be a series of spaced apart vertical rungs, without the connecting extending horizontal side bars, or any other structure or apparatus that permits self propelled or automated transportation of the maintenance personnel 10 above the VWAT 120 to access the antenna supporting portion of the tower. As shown in this figure, it may be preferable that the tower 120 is a hollow tube below upper access door 603, but of strut or truss construction above it.

FIG. 7 illustrates an alternative and more preferred embodiment in which the tower 110 is solid but internally hollow to provide access via the internal ladder 602 as in FIG. 6, however, the exit portal 613 and upper access door 603 are now located below the VWAT 120, in the lower portion 110*a*, such that the upper portion 110*c* of the tower 110 below the antenna system 105, including the panel type transceivers 140, is of a hollow strut or truss construction structure through which the ladder 602 optionally extends providing access to transceivers 140 while the VWAT 120 rotates. Depending on the strut or truss spacing the ladder need not be a continuous unitary structure, but can be additional foot and handhold members spaced apart the conventional distance of about a foot (about 30 cm), which may include some strut or truss members themselves.

Figure 8A:
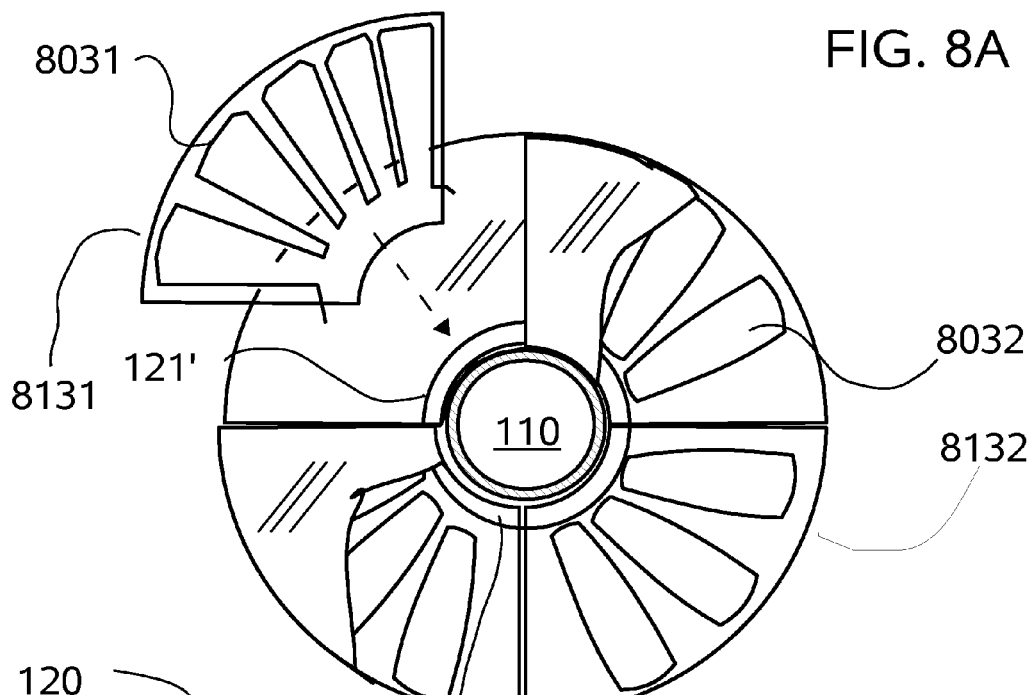
Figure 8B:
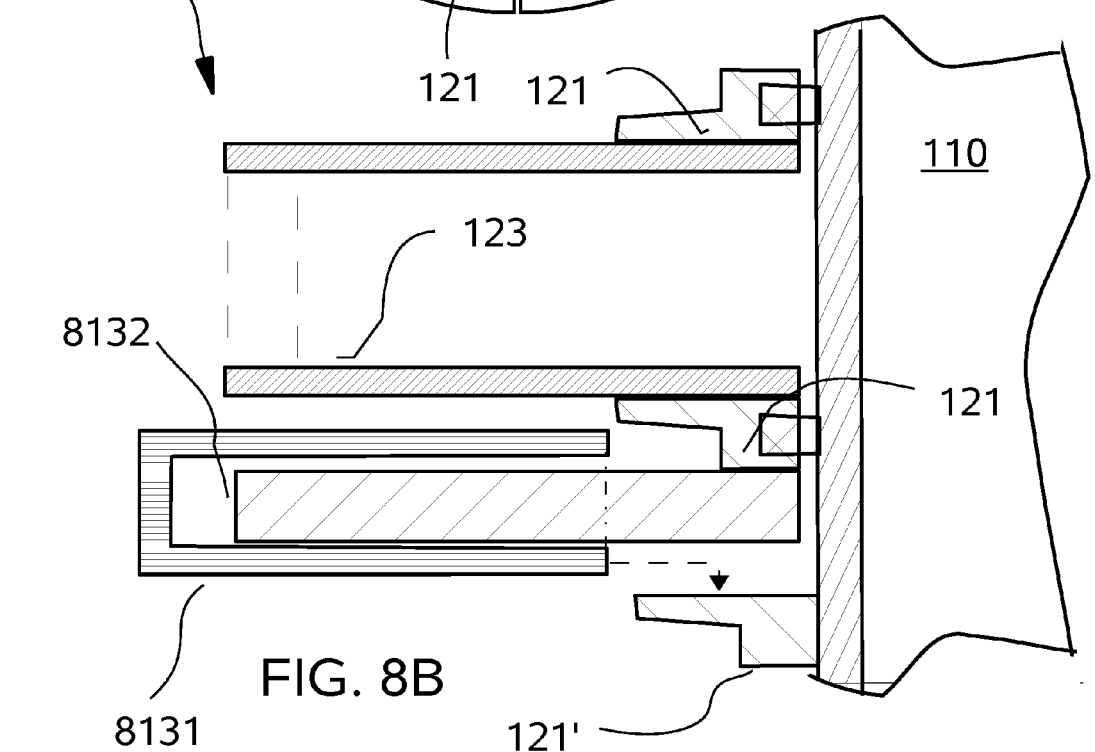
FIG. 8B is a cross-sectional elevation thereof.

FIG. 8A schematically illustrates in a plan view of a preferred embodiment in which portions of the generator are assembled from arc shaped segments that surround the hollow tower 110. FIG. 8B is a cross-sectional elevation of the same region. The stator 131 is formed from a plurality of arc shaped stator segments 8131 that are attached to a flange or hub 121' that is coupled to the tower 110 to provide the stationary portion of the generator 130. The rotor 132 is formed from a plurality of arc shaped rotor segments 8132 that are attached to a flange or hub 121 that is coupled to tower 110 by rotary bearings to form one or more rotor assemblies 131. One or within each rotor segment 8132 are a plurality of wedge shaped magnets 8032 that alternatively in polarity to provide along with the stator 131, an axial gap electric dynamo type generator/alternator. In the more preferred embodiment of FIG. 8B, each arc shaped segment 8131 that will form the stator disc 131 has connected serpentine wiring 8031 loops on both sides and is inserted sideways over the rotor disc 132. The serpentine winding in such a disc is disclosed in U.S. Pat. No. 7,646,132 B2, issued to R. Halstead on Jan. 12, 2010, which is incorporated herein by reference. It should also be appreciated that such arc shaped rotor and stator segment can be pre-assembled into arc shaped units which are then mounted on the appropriate hub structure on the periphery of the tower 110. Further, one the arc shaped segment of the rotor and stator are coupled to the tower via a hub they can be mechanically coupled to each other for greater stability.

It is also preferred that a magnetic bearing be deployed at the outer extremity or perimeter of the rotor disk 132, such as that disclosed in the US Pat. Application No. used at the perimeter of the rotor disk 132, as disclosed in US Patent Publication No. 2009-200883A1, published on Aug. 13, 2009, which is incorporated herein by reference. Such a magnetic bearing assembly can also be assembled in arc shaped segment as described above.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

For example, the VAWT 120 of antenna assembly 100 may deploy additional pairs of stacked coupled blade assemblies than the two (125 and 126) shown in FIG. 1-3, as for example 3 to 4 blade assemblies. In addition, more than 3 individual blades or air foils 123 can be deployed in the 2 or more blades assemblies, as for example 3-5 blades per stacked blade assembly. This would provide more power pulses per revolution at the same periodicity provided there is a symmetrical offsetting or staggering of the blades 123 on each tier or blade assembly. In the example in which the VWAT deployed 3 tiers or stacked coupled blade assemblies and 3 blades 123 are deployed on each tier, the first blade 123 would have an absolute angular references about the tower axis of zero degrees, with the other 2 blades on the same tier would be set at 120 and 240 degrees (for a spacing of 360/number of blades). Whereas on the upper or second tier the blades would at an angular reference position or offset of 40, 160 and 280 degrees, as well as an angular offset on 80, 200 and 220 degrees on the third tier of blades. Note that the annular offset between each tier is the spacing within the tier (120 degrees), divided by the number of tiers. It should now be appreciated that other variations of spacing and different numbers of tiers are both possible and practical.

I claim:
1. A tower structure comprising,
a) a substantially vertical support tower having a top portion and a lower mounting base and at least a portion with a central opening therein between the top portion and the lower mounting base thereof,
b) a vertically arrayed wind turbine (VAWT), having a central mounting hub and a plurality of turbine blades coupled thereto to provide free rotation about the central opening of said substantially vertical support tower,
c) an electrical generator rotationally coupled to said central mounting hub,
d) at least one of a receiver, transmitter or transceiver of electromagnetic radiation supported by said substantially vertical support tower and disposed above said VAWT,
e) at least one cable for power transmission extending downward from the generator, being electrically coupled thereto to the lower mounting base, and
f) at least one cable extending upward from the lower mounting base through the central mounting hub of the VAWT to connect in signal communication with said at least one of an receiver, transmitter or transceiver, g) an internal ladder that extends vertically through the central opening in the substantially vertical support tower.

2. A tower structure according to claim 1 in which the lower mounting base is substantially at ground level wherein the internal ladder that extends vertically through the central opening in the substantially vertical support tower extends further downward so that it is accessible at ground level.

3. A tower structure according to claim 1 wherein the generator comprises at least one rotor and one stator disk, and the stator disk is composed of arc shaped segments that are attached to a common hub disposed on the outer periphery of the tower structure, in which each arc shaped segment has an upper and lower portion of connected serpentine conductor wires that are disposed on opposing sides of a portion of the rotor disk.

4. A tower structure according to claim 1 wherein the generator comprises at least one rotor and one stator disk, and at least one of the stator disk and the rotor disk are composed of arc shaped segments that are attached to a common hub disposed on the outer periphery of the tower structure.

5. A tower structure according to claim 1 having a substantially open truss structure over at least the vertical expanse of the turbine blades that correspond to the central opening in the substantially vertical support tower.

6. A tower structure according to claim 5 wherein the open truss structure is composed of vertically spaced apart rings held at their outer periphery by a plurality of vertical posts.

7. A tower structure according to claim 5 wherein the portion of the substantially vertically support tower that extends upward to the central opening is a hollow tube.

8. A tower structure according to claim 7 wherein the internal ladder that extends vertically through the central opening in the substantially vertical support tower extends further downward within the hollow tube.

9. A tower structure according to claim 8 in which the lower mounting base is substantially at ground level wherein the hollow tube has a first lower portal accessible from ground level and a second upper portal disposed below the VWAT.

10. A tower structure according to claim 5 and further comprising a battery configured to be charged by the output of the electrical generator.

11. A tower structure according to claim 10 wherein the battery is configured to power said least one of a receiver, transmitter or transceiver of electromagnetic radiation supported by said substantially vertical support tower and disposed above said VAWT.

12. A tower structure according to claim 10 wherein the battery is configured to power said least one of a receiver, transmitter or transceiver of electromagnetic radiation supported by said substantially vertical support tower and disposed above said VAWT.

13. A tower structure according to claim 10 wherein the battery is configured to power said least one of a receiver, transmitter or transceiver of electromagnetic radiation supported by said substantially vertical support tower and disposed above said VAWT.

14. A tower structure comprising,
a) a substantially vertical support tower having a top portion and a lower mounting base and at least a portion with a central opening therein between the top portion and the lower mounting base thereof,
b) a vertically arrayed wind turbine (VAWT), having a central mounting hub and a plurality of turbine blades coupled thereto to provide free rotation about the central opening of said substantially vertical support tower,
c) an electrical generator rotationally coupled to said central mounting hub,
d) at least one of a receiver, transmitter or transceiver of electromagnetic radiation supported by said substantially vertical support tower and disposed above said VAWT,
e) at least one cable for power transmission extending downward from the generator, being electrically coupled thereto to the lower mounting base, and
f) at least one cable extending upward from the lower mounting base through the central mounting hub of the VAWT to connect in signal communication with said at least one of an receiver, transmitter or transceiver wherein the generator comprises at least one rotor and one stator disk, and at least one of the stator disk and the rotor disk are composed of arc shaped segments that are attached to a common hub disposed on the outer periphery of the tower structure.

15. A tower structure according to claim 14 wherein each of the at least one rotor and one stator disk, is composed of arc shaped segments that are attached to a common hub disposed on the outer periphery of the tower structure.

16. A tower structure according to claim 14 wherein the VWAT deploys at least 2 tiers of stacked coupled blade assemblies.

17. A tower structure according to claim 14 and further comprising a battery configured to be charged by the output of the electrical generator.

18. A tower structure comprising,
a) a substantially vertical support tower having a top portion and a lower mounting base and at least a portion with a central opening therein between the top portion and the lower mounting base thereof,
b) a vertically arrayed wind turbine (VAWT), having a central mounting hub and a plurality of turbine blades coupled thereto to provide free rotation about the central opening of said substantially vertical support tower,
c) an electrical generator rotationally coupled to said central mounting hub,
d) at least one of a receiver, transmitter or transceiver of electromagnetic radiation supported by said substantially vertical support tower and disposed above said VAWT,
e) at least one cable for power transmission extending downward from the generator, being electrically coupled thereto to the lower mounting base, and
f) at least one cable extending upward from the lower mounting base through the central mounting hub of the VAWT to connect in signal communication with said at least one of an receiver, transmitter or transceiver, wherein the generator comprises at least one rotor and one stator disk, and the stator disk is composed of arc shaped segments that are attached to a common hub disposed on the outer periphery of the tower structure, in which each arc shaped segment has an upper and lower portion of connected serpentine conductor wires that are disposed on opposing sides of a portion of the rotor disk.

19. A tower structure according to claim 18 wherein a magnetic bearing structure is disposed substantially below the periphery of the rotor disk.

20. A tower structure according to claim 18 and further comprising a battery configured to be charged by the output of the electrical generator.

* * * * *